March 13, 1962 W. J. SIEBER 3,024,884
BACK LOCKING DRIVE MEANS
Filed Dec. 17, 1959

INVENTOR.
WILLIAM J. SIEBER
BY Lyon & Lyon
ATTORNEYS 3,024,884
BACK LOCKING DRIVE MEANS
William J. Sieber, Van Nuys, Calif., assignor, by mesne assignments, to Adams Rite Manufacturing Company, a corporation of California
Filed Dec. 17, 1959, Ser. No. 860,162
6 Claims. (Cl. 192—8)

This invention relates to back locking drive means, and included in the objects of this invention are:

First, to provide a back locking drive means which transmits rotation in either direction from a driving element to a driven element, but locks against transmission of rotation from the driven element to the driving element.

Second, to provide a back locking drive means wherein the driving and driven element are so coupled as to virtually eliminate back lash or relative free movement.

Third, to provide a back locking drive means wherein the driving and driven elements may have a one-to-one ratio, and are positively coupled so that the orientation of the driven element remains fixed with respect to the driving element; thereby providing a drive means which is particularly suitable for the operation of various control instruments.

Fourth, to provide a back locking drive means which permits wide latitude in the relative physical position of the driving and driven elements so that the drive means may be arranged to incorporate various speed-changing devices, and adapted to a wide range of uses.

Fifth, to provide a back locking drive means which is adapted to intermittent, partial rotation by small increments, or continuous rotation of the driving and driven elements.

Sixth, to provide a back locking drive means which may be arranged as an unidirectional drive means whereby the driven shaft is locked against rotation in only one direction.

With the above and other objects in view, as may appear hereinafter, reference is directed to the accompanying drawings in which.

Figure 2:
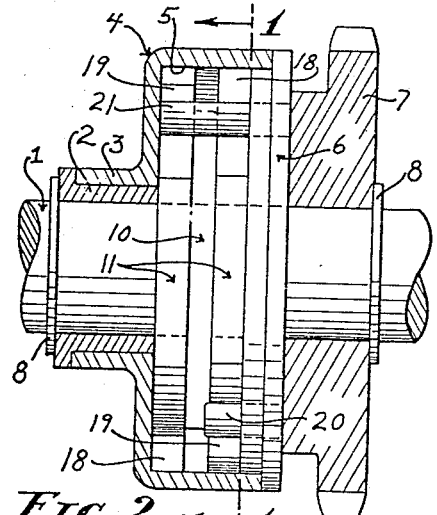
FIGURE 2 is a longitudinal, sectional view thereof taken through 2—2 of FIGURE 1 with portions shown in elevation.
Figure 1:
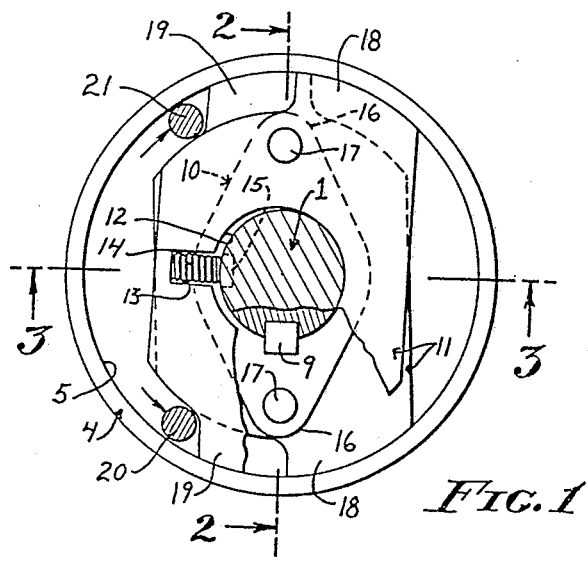
FIGURE 1 is a transverse, sectional view of the back locking drive means taken substantially through 1—1 of FIGURE 2 with portions broken away to show underlying parts.
Figure 3:
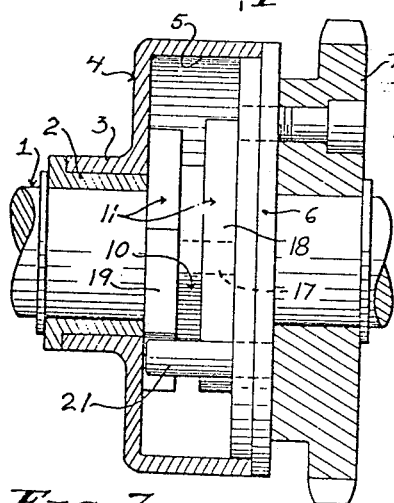
FIGURE 3 is a longitudinal, sectional view thereof taken through 3—3 of FIGURE 1 with portions shown in elevation.

The back locking drive means is mounted on a driven shaft 1 which is shown as extending through both ends of the drive means, for purposes of illustration. Mounted on the driven shaft 1 is a bearing 2 fitted within a tubular boss 3 which projects from the closed end of a cup-shaped housing 4. The housing defines a cylindrical braking surface 5 concentric with the driven shaft 1.

Journaled in the open end of the housing 4 is a driving disk 6 which is suitably connected to a driving gear 7, or other means. The driving disk 6 and gear 7 may be journaled on the driven shaft 1. The assembly may be held in place on the driven shaft by retainer rings 8.

Secured on the driven shaft 1 by a key 9, or other suitable means, is a driven plate 10. Loosely mounted on the driven shaft 1, on opposite sides of the driven plate 10, is a pair of locking plates 11. Each locking plate is provided with a central opening 12 of slightly larger dimension than the driven shaft 1, so that the locking plate 11 is capable of limited translation movement relative to the driven shaft 1.

Each locking plate 11 is provided with a notch 13 which receives a spring 14 directed toward the driven shaft 1 and seated in a socket 15, there being a socket 15 on each side of the driven plate 10. The sockets 15 and springs 14 are coplanar so that the two locking plates 11 are urged laterally in the same direction with respect to the driven shaft 1.

The driven plate 10 is provided with diametrically disposed projections 16 in which are fixed pins 17. The pins are directed in axially opposite relation and fit into corresponding holes provided in the locking plates 11. The two locking plates 11 are identical, and each locking plate is provided with diametrically disposed locking lugs 18 and 19, which are urged by the corresponding spring 14 into binding or locking engagement with the cylindrical brake surface 5 of the housing 4. This is made possible by the clearance afforded between the central openings 12 and the driven shaft 1.

Each locking plate 11 is inverted relative to the other locking plate, so that each of the diametrically opposite pins 17 is in proximity to the locking lug 18 of the corresponding locking plate 11. As a consequence, a torsional force exerted by either pin 17 in the direction of the force exerted by the spring 14 on the corresponding locking plate 11 causes the corresponding locking plate to wedge or bind against the cylindrical brake surface 5 and lock the driven shaft 1 against rotation relative to the housing 4. Inasmuch as the two pins 17 are diametrically opposed, the driven shaft 1 is locked against rotation when attempt is made to transmit such rotation by turning the driven shaft 1 in either direction. That is, an attempt to turn the driven shaft in one direction is resisted by one of the locking plates 11, whereas an attempt to rotate the driven shaft in the opposite direction is resisted by the other locking plate 11.

While both locking lugs 18 and 19 function to bind against the cylindrical brake surface 5, there is a tendency under urge of a pin 17 against the corresponding locking plate 11 to cause the corresponding locking plate to fulcrum about the locking lug 19, forcing its corresponding locking lug 18 into binding engagement with the cylindrical brake surface 5.

In order to rotate the locking plates 11 and consequently to rotate the driven shaft 1, the driving disk 6 is provided with a pair of drive pins 20 and 21 which engage the respective lugs 19 of the two locking plates 11. The locking lugs 19 are engaged by the drive pins 20 and 21, respectively, in a direction in opposition to the corresponding spring 14. This tends to pivot the corresponding locking plate 11 about its pin 17 in a direction to free the locking lugs 18 and 19 from the cylindrical brake surface 5.

Operation of the back locking drive means is as follows:

If the gear 7 and driving disk 6 are rotated in either direction, one or the other of the drive pins 20 and 21 engages the locking plate 11 which would otherwise resist rotation of the driving disk 6 so as to release this locking plate. Inasmuch as both locking plates 11 are tied together through the pins 17 and driven plate 10, rotation of the driving disk 6 causes rotation of the locking plates 11 in unison, as well as rotation of the driven shaft 1 in unison with the driving disk 6.

However, if the direction of force is reversed and an attempt is made to rotate the driven shaft 1 in either direction, the corresponding pin 17 causes its locking plate 11 to engage the cylindrical surface 5 and lock the driven shaft against rotation. Inasmuch as the two locking plates 11 are disposed so as to function in opposite directions, the driven shaft 1 is locked against any force within the strength of the drive means which tends to turn the driven shaft in either direction. As a consequence, torsional or vibrational force on the driven shaft 1 has no effect in turning the driven shaft. The driven shaft can only be turned if the gear 7 and driving disk 6 are rotated to release the locking plates 11.

In the foregoing analysis of the operation of the driving disk 6 and driven shaft 1, the housing 4 is considered as being fixed in position. It is possible, however, that the housing 4 may be considered as the rotary member, with the driving disk 6 and gear 7 acting to advance or retard the position of the driven shaft 1 with respect to the housing 4.

Figure 4:
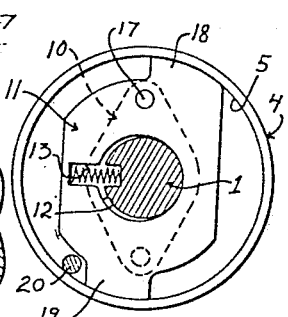
FIGURES 4 and 5 are diagrammatical, sectional views taken substantially in the plane of FIGURE 1, showing one of the locking members in its operating or locking position and in its free position, respectively.
Figure 5:
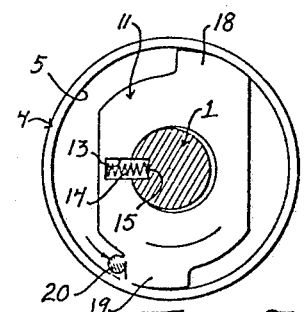
Figure 6:
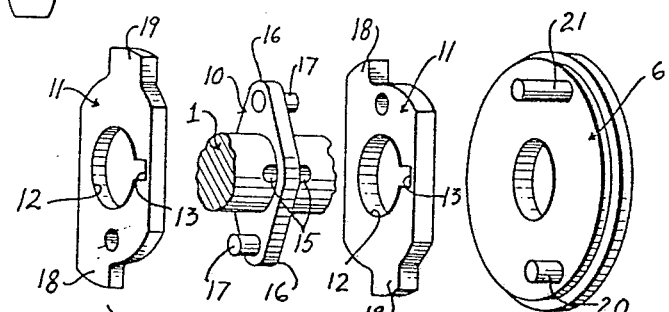
FIGURE 6 is an exploded view with portions shown fragmentarily and in perspective, and with the housing omitted.

In order to understand the interaction of the forces which effect operation of the locking plates 11, reference is directed particularly to FIGURES 4 and 5 in which only one of the locking plates 11 is illustrated. When the drive pin 20 is clear of its locking plate, or more specifically its locking lug 19, the spring 14 fulcrums the locking plate 11 about the pin 17 so as to wedge the locking lugs 18 and 19, as shown in FIGURE 4. As a consequence, torsional force in the direction of the broken arrow in FIGURE 4 merely wedges the locking lugs 18 and 19 within the cylindrical braking surface 5 so as to prevent rotation in this direction.

When the drive pin 20, or 21, as the case may be, engages the locking lug 19 in opposition to the spring 14, the locking plate 11 pivots about the pin 17 to the position shown in FIGURE 5. This movement is essentially a translation movement, insofar as the movement of the locking plate 11 with respect to the cylindrical brake surface 5 is concerned, and has the effect of freeing the locking lugs 18 and 19 from the cylindrical brake surface 5. The movement of the locking plate 11 indicated in FIGURES 4 and 5 is greatly exaggerated. As a matter of fact, the movement of the locking plate 11 from its locking position to its free-running position is almost imperceptible.

As illustrated in FIGURE 4, one locking plate 11 locks rotation of the driven shaft 1 in only one direction, so that if the conditions of installation are such as to require locking of the driven shaft 1 in only one direction, then only one locking plate 11 need be used. However, in order to lock the driven shaft 1 against movement in either direction except as permitted by the driving disk 6, two locking plates 11 are required.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A back locking drive means, comprising: a housing having an internal annular brake surface; a locking member rotatable in said housing and having substantially diametrically disposed relatively fixed locking elements engageable with said brake surface; yieldable means tending to cause lateral translation of said locking member relative to said housing to urge both of said locking elements into locking engagement with said brake surface, one of said locking elements of each locking member tending to fulcrum said locking member; a driving element movable in a circular path within said housing adjacent said annular brake surface and engageable with said locking member in opposition to said yieldable means to effect rotation of said locking member in said housing; and a driven element connected with said locking member for rotation therewith, but arranged to apply a back force on said locking member in the direction of said yieldable means to lock said locking member and driven element.

2. A back locking drive means, comprising: a housing having an internal annular brake surface; a pair of locking members rotatably mounted in said housing, each having substantially diametrically disposed locking elements engageable with said brake surface on lateral translation perpendicular to the regions of contact of said locking elements with said annular brake surface, one of said locking members being inverted with respect to the other; yieldable means tending to cause lateral translation of said locking members in a common direction within said housing to urge said locking elements into engagement with said brake surface, to lock the inverted locking member against rotation relative to said housing in one direction, and to lock the other of said locking members against rotation relative to said housing in the opposite direction; a driving element rotatable in either direction relative to said housing and including means engageable with a selected locking member to free said locking members for rotation with said driving element; and a driven element connected with said locking members to rotate therewith, said driven element being inoperative to rotate said locking members.

3. A back locking drive means, comprising: a housing having an internal annular brake surface; a driven shaft journaled within said housing; a pair of locking members loosely mounted on said driven shaft, each locking member having a substantially diametrically disposed locking element and a fulcrum element engageable with the annular brake surface, the locking and fulcrum elements of one locking member being diametrically opposed to the corresponding elements of the other locking member; means offset from the axis of said driven shaft tending to pivot said locking members about their respective fulcrum elements to effect a drive connection between said locking members and said driven shaft; yieldable means between said driven shaft and said locking members also urging said locking members to pivot into operative engagement with said brake surface thereby to restrain said driven shaft against rotation relative to said housing; and means engageable with said locking members in opposition to said yieldable means to release said locking members for rotation of said locking members and driven shaft relative to said housing.

4. A back locking drive means, comprising: a housing having an internal annular brake surface; a driven shaft journaled within said housing; a pair of locking members loosely mounted on said driven shaft, each locking member having a diametrically disposed locking element and a fulcrum element, one of said locking members being inverted relative to the other whereby the locking element of one locking member is adjacent the fulcrum element of the other locking member, whereby lateral force applied in the same direction between said shaft and said locking members tends to cause said locking members to bind said annular brake surface against rotation in either direction; yieldable means between said driven shaft and said locking members urging said locking members laterally of said driven shaft in the same direction and into operative engagement with said brake surface to restrain said driven shaft against rotation in either direction relative to said housing; means connecting said driven shaft with said locking members and operable in concert with said yieldable means to operatively connect said members with said housing; and a driving member journaled with respect to said housing and including means offset from said driven shaft engageable with said locking members in opposition to said yieldable means to release said locking members from said housing, thereby to permit rotation of said driving member, locking members, and driven shaft in unison.

5. A back locking drive means, comprising: a housing having an internal annular brake surface; a driven shaft journaled within said housing; a pair of locking members loosely mounted on said driven shaft, each including substantially diametrically disposed locking elements and fulcrum elements, said locking members being relatively disposed to pivot in opposite directions about said fulcrum elements when urged laterally in the same direction with respect to said driven shaft thereby to engage said brake surface; yieldable means for urging said locking members laterally of said shaft whereby said locking members normally restrain said driven shaft against rotation relative to said housing; and means engageable with said locking members in opposition to said yieldable means to release said locking members for rotation of said locking members and driven shaft relative to said housing.

6. A back locking drive means, comprising: a housing having an internal annular brake surface; a driven shaft journaled within said housing; a pair of locking members loosely mounted on said driven shaft, each including substantially diametrically disposed locking elements and fulcrum elements, said locking members being relatively disposed to pivot in opposite directions about said fulcrum elements when urged laterally in the same direction with respect to said driven shaft thereby to engage said brake surface; yieldable means for urging said locking members laterally of said shaft whereby said locking members normally restrain said driven shaft against rotation relative to said housing; and a driving member journaled with respect to said housing and including means offset from said driven shaft engageable with said locking means in opposition to said yieldable means to release said locking members from said housing, thereby to permit rotation of said driving member, locking members, and driven shaft in unison.

References Cited in the file of this patent
UNITED STATES PATENTS

| | | |
|---|---|---|
| 2,223,217 | Little | Nov. 26, 1940 |
| 2,514,465 | Bergsma | July 11, 1950 |